US012688408B1

(12) United States Patent　　　　(10) Patent No.:　US 12,688,408 B1

Ganesan et al.　　　　　　　　　　(45) Date of Patent:　　　Jul. 21, 2026

(54) SYSTEMS AND METHODS FOR USING DEEP MACHINE LEARNING TO PROBLEMS CORRESPONDING TO NON-LINEAR GENERATOR FUNCTIONS

(71) Applicant: Wells Fargo Bank, N.A., San Francisco, CA (US)

(72) Inventors: Narayan Ganesan, San Francisco, CA (US); Yajie Yu, San Francisco, CA (US); Bernhard Hientzsch, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 980 days.

(21) Appl. No.: 17/140,410

(22) Filed: Jan. 4, 2021

(51) Int. Cl.
　　*G06N 3/08*　　　(2023.01)
　　*G06F 17/18*　　　(2006.01)
　　*G06N 3/04*　　　(2023.01)
(52) U.S. Cl.
　　CPC ............... *G06N 3/08* (2013.01); *G06F 17/18* (2013.01); *G06N 3/04* (2013.01)
(58) Field of Classification Search
　　CPC ............. G06N 3/08; G06N 3/04; G06F 17/18
　　See application file for complete search history.

(56) References Cited

U.S. PATENT DOCUMENTS

2018/0260902 A1* 9/2018 Curran ................... G06Q 40/06

OTHER PUBLICATIONS

Authors: Han et al. Title: Overcoming the curse of dimensionality: Solving high-dimensional partial differential equations using deep learning Publication Date: Jul. 9, 2017 (Year: 2017).*

Authors: Liang et al Title: Deep Learning-Based Least Square Forward-Backward Stochastic Differential Equation Solver for High-Dimensional Derivative Pricing Publication date: Oct. 12, 2020 (Year: 2020).*

Authors: Bernhard Hientzsch* Title: Introduction to Solving Quant Finance Problems with Time-Stepped FBSDE and Deep Learning (Year: 2019).*

Bernhard Hientzsch Introduction to solving quant finance problems with time-stepped FBSDE and deep learning. arXiv preprint arXiv:1911. 12231, Nov. 2019.

(Continued)

*Primary Examiner* — David Yi
*Assistant Examiner* — Amy Tran
(74) *Attorney, Agent, or Firm* — K&L Gates LLP

(57)　　　　ABSTRACT

Systems, apparatuses, methods, and computer program products are disclosed for determining a value corresponding to a composite object. Paths are determined based on initial values of underlying items of the composite object and random numbers. A DNN is trained by determining a final value for each path based on a final set of items corresponding to the path at the final time, iterating the value backward in time using a non-linear generator function from the final value to an initial value, defining a set of initial values comprising the initial value determined for each path and determining a statistical measure based on the set of initial values, and modifying parameters of the DNN based on the statistical measure. Value information comprising the value for the composite object at one or more times is determined based on output of the DNN. The value information is provided such that a user computing device receives it.

18 Claims, 7 Drawing Sheets

(56) References Cited

OTHER PUBLICATIONS

Bing Yu et al., "Deep-learning based numerical BSDE method for Barrier options" arXiv preprint arXiv:1904.05921, (2019).

Co me Huré, et al., "Some machine learning schemes for high-dimensional nonlinear PDEs" dated Feb. 5, 2019.

Fabio Mercurio, Bergman, Piterbarg, and beyond: "Pricing derivatives under collateralization and differential rates", In Actuarial Sciences and Quantitative Finance, pp. 65-95. Springer, (2015).

Ganesan, Narayan et al., "Pricing Barrier Options with DeepBSDEs", Corporate Model Risk, Wells Fargo, dated May 22, 2020.

Haojie Wang et al., "Deep learning-based BSDE solver for LIBOR market model with application to bermudan swaption pricing and hedging", Jul. 10, 2018.

Jian Liang et al., "Deep learning-based least square forward-backward stochastic differential equation solver for high-dimensional derivative pricing" Jul. 23, 2019.

Jiequn Han et al. "Solving high-dimensional partial differential equations using deep learning", Proceedings of the National Academy of Sciences, 115(34):8505-8510, (Aug. 21, 2018).

Maziar, Raissi "Forward-backward stochastic neural networks: Deep learning of high-dimensional partial differential equations" arXiv preprint arXiv:1804.07010, (Apr. 19, 2018).

Nicolas Perkowski, "Backward Stochastic Differential Equations: an Introduction", (2010).

Nicole El Karoui et al. "Backward stochastic differential equations in finance", Mathematical finance, 7(1):1-71, 1997.

Peter A Forsyth et al., "Numerical methods for controlled hamilton-jacobi-bellman PDES in finance" Journal of Computational Finance, 11(2):1-44, 2007.

Quentin Chan-Wai-Nam et al. "Machine learning for semi linear PDEs", Journal of Scientific Computing, 79(3):1667-1712, 2019. arXiv:1809.07609.

Weinan E et al., "Deep learning-based numerical methods for high-dimensional parabolic partial differential equations and backward stochastic differential equations", Communications in Mathematics and Statistics, 5(4):349-380, dated Jun. 16, 2017.

Xavier Warin, "Nesting monte carlo for high-dimensional non linear PDEs", dated 2018.

* cited by examiner

20

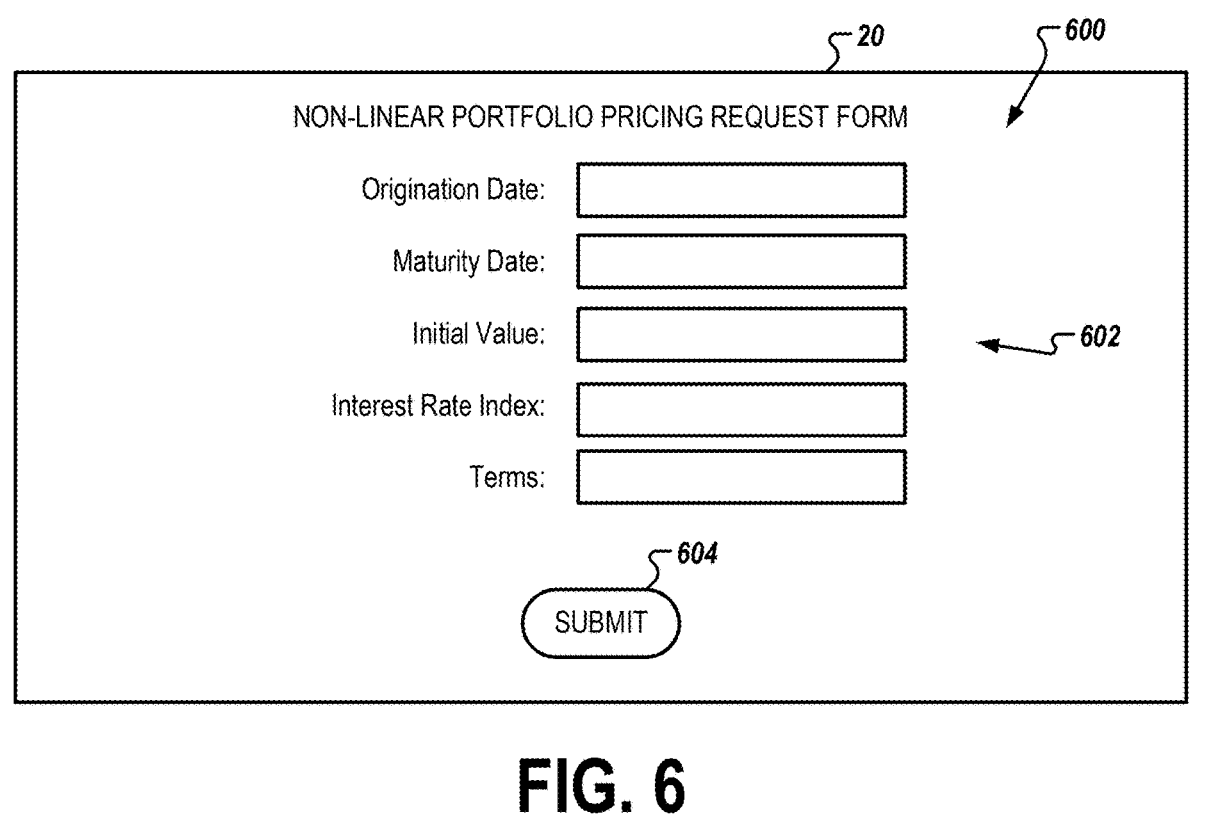

_r20_                              _r600_

NON-LINEAR PORTFOLIO PRICING REQUEST FORM

Origination Date: [                    ]

Maturity Date: [                    ]

Initial Value: [                    ]        ← _r602_

Interest Rate Index: [                    ]

Terms: [                    ]

_r604_

( SUBMIT )

FIG. 6

NON-LINEAR PORTFOLIO PRICING

Initial Value:        23.13 – 24.12

Value at Time A:    24.37 – 24.89

Value at Time B:    23.45 – 24.01

Value at Time C:    24.89 – 25.18

Value at Maturity:  25.29 – 25.59

| | Control | Analytical Solution | Agreement of Analytical Solution to Control | Taylor Expansion Approximation (TEA) | Agreement of TEA to Control |
|---|---|---|---|---|---|
| Upper Bound | 24.06520 | 24.07282 | 1.0003 | 24.07278 | 1.0003 |
| Lower Bound | 23.05854 | 23.12601 | 1.0029 | 23.12606 | 1.0029 |

SYSTEMS AND METHODS FOR USING DEEP MACHINE LEARNING TO PROBLEMS CORRESPONDING TO NON-LINEAR GENERATOR FUNCTIONS

TECHNOLOGICAL FIELD

Example embodiments of the present disclosure relate generally to the use of deep machine learning in determining solutions to non-linear problems and, more particularly, to systems and methods for providing solutions to non-linear problems in real time or near real time.

BACKGROUND

Non-linear problems relate to a wide variety of arenas, such as weather prediction, chaotic systems (e.g., the climate, stock market, fluid flow), wild animal population management, etc. In various scenarios, it is helpful to be able to model, compute, and/or approximate path wise values of a function corresponding to a non-linear problem. Traditional methods for computations for similar linear problems include partial differential equation (PDE) methods, which are only capable of handling low dimensional problems, and standard Monte Carlo methods, which are computationally expensive and cannot effectively solve problems with a large number of dimensions. Moreover, PDE methods become even more computationally demanding for nonlinear problems while standard Monte-Carlo methods cannot handle non-linear problems.

BRIEF SUMMARY

In various instances, it may be desirable to determine expressions for functions or to compute path wise values of a function that solve non-linear problems. One such example non-linear problem is determining the value of a portfolio that is being funded or provides funding under different interest rates under different conditions, such as where negative cash balances (borrowing) attract a higher interest rate compared to positive cash balances (lending). Conventional methods fail to provide techniques that are computationally efficient enough so that multidimensional cases are tractable. For example, multidimensional situations might occur when the portfolio depends on several underlying stocks or other financial underliers. Various embodiments address this technical problem by providing a computationally efficient technique for determining expressions for functions or path wise values for nonlinear problems with nonlinear generator functions.

Various embodiments provide methods, systems, apparatuses, and/or computer program products for the efficient determination of path wise values at one or more points in time. Various embodiments, provide methods, systems, apparatuses, and/or computer program products for the efficient determination of a function that may be evaluated based on a set of objects or items to determine a path wise value at a point in time. Various embodiments are configured to determine and provide one or more path wise values in real time or near real time with respect to receiving a corresponding request. Various embodiments provide an interactive user interface (IUI) through which a user may cause a request for one or more path wise values to be determined to be provided and through which a user may be provided a graphical and/or tabular representation of the one or more path wise values or function values of interest.

In various embodiments, the path wise values or functions are determined using a backward deep neural network (DNN) solver in which DNNs are trained as parts of a larger computational graph that computes a loss function. In various embodiments, the problem for determining the values or functions may be posed as a partial differential equation (PDE) and/or an equivalent forward backward stochastic differential equation (FBSDE) having a non-linear generator function. In various embodiments, the backward DNN solver, through deep learning, is trained to determine path wise values and/or functions that may be evaluated based on a set of objects or items to determine a path wise value. In various embodiments, the DNN of the backward DNN solver comprises a plurality of sub-nets or individual DNNs, with each sub-net or individual DNN corresponding to one time in a set of times. Each of the sub-nets or individual DNN are trained simultaneously such that the path wise values or the functions at multiple points in time are determined through one training of the backward DNN solver.

In various embodiments, a training iteration of the backward DNN solver comprises determining a final value of the path wise values at a final time and projecting the value of the path wise values backward in time, through one or more intermediate values corresponding to one or more intermediate times, back to an initial value of the path wise values corresponding to an initial time. This backward projection is performed along a plurality of paths corresponding to the evolution of a set of objects or items. A loss function may be evaluated based on the results of the backward projection along the plurality of the paths. The loss function may consider that statistical spread of the initial values of the path wise values or difference between a learned value for the initial value of the path wise values and the determined set of initial values for the path wise values. In an example embodiment, the loss function may also consider the difference between one or more learned intermediate values of the path wise values and a set of determined intermediate values for the path wise values. The weights and/or parameters of the backward DNN solver (e.g., weights and/or parameters of the sub-nets and/or individual DNNS) are modified to decrease the loss function on the next training iteration of backward projection for the plurality of paths. Once the backward DNN solver satisfies a convergence requirement (e.g., the loss function is sufficiently small and/or the number of training iterations has reached a particular number) the resulting values of the path wise values and/or functions describing the path wise values as a function of a set of objects or items, at the various points in time are provided (e.g., for display to a user via a user computing device, stored in memory for later use, provided as input to a computer application, and/or the like). This backward projection of the value of the path wise values provides the basis of the name backward DNN solver. In various embodiments, the DNN (e.g., the sub-nets and/or individual DNNs) of the backward DNN solver comprises a feedforward DNN. For example, the information within the backward DNN solver moves from the input nodes, through the hidden nodes, and out to the output nodes without forming any cycles or loops within the network.

According to a first aspect, a method for determining a current value corresponding to a final payoff targeted by a strategy where different parts (denoted here items) of the strategy portfolio (denoted here composite object) may be associated with different rates. The method comprises determining, by one or more processors, a plurality of paths based on an initial set of items of the composite object and Brownian motion paths. Each path corresponds to a set of times comprising an initial time, a final time, and one or more intermediate times between the initial time and the final time. The method further comprises causing, by one or more processors, a deep neural network (DNN) of a backward DNN solver to be trained until a convergence requirement is satisfied by, determining a final value for each path based on a final set of items of the composite object corresponding to the path at the final time, iterating backward in time from the final value corresponding to the final time to determine intermediate values each corresponding to one of the one or more intermediate times and to determine an initial value corresponding to the initial time using a non-linear generator function, defining a set of initial values comprising the initial value determined for each path and determining one or more statistical measures of spread based on the set of initial values, and modifying one or more parameters of the DNN based on the one or more statistical measures of spread. The method further comprises, after the convergence requirement is satisfied, determining, by the one or more processors, value information comprising the value corresponding to the composite object at one or more times of the set of times based on an output of the DNN; and causing, by the one or more processors, at least a portion of the value information to be provided. For example, user computing device may receive the at least a portion of the value information and provide a representation of the at least a portion of the value information via an interactive user interface provided via a display of the user computing device.

According to another aspect, an apparatus for determining a value corresponding to a composite object is provided, wherein the composite object comprises a plurality of items the items may be associated with different rates. In an example embodiment, the apparatus comprises processing circuitry (e.g., one or more processors, solver circuitry, and/or DNN circuitry). In an example embodiment, the processing circuitry is configured to determine a plurality of paths based on an initial set of items of the composite object and Brownian motion paths. Each path corresponds to a set of times comprising an initial time, a final time, and one or more intermediate times between the initial time and the final time. The processing circuitry is further configured to cause a deep neural network (DNN) of a backward DNN solver to be trained until a convergence requirement is satisfied by, determining a final value for each path based on a final set of items for the composite object corresponding to the path at the final time, iterating backward in time from the final value corresponding to the final time to determine intermediate values each corresponding to one of the one or more intermediate times and to determine an initial value corresponding to the initial time using a non-linear generator function, defining a set of initial values comprising the initial value determined for each path and determining one or more statistical measures of spread based on the set of initial values, and modifying one or more parameters of the DNN based on the one or more statistical measures of spread. The processing circuitry is further configured to, after the convergence requirement is satisfied, determine value information comprising the value for the composite object at one or more times of the set of times based on an output of the DNN; and cause at least a portion of the value information to be provided. For example, a user computing device may receive the at least a portion of the value information and provide a representation of the at least a portion of the value information via an interactive user interface provided via a display of the user computing device.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

FIG. 6 illustrates an example IUI that may be used to cause the generation of a request for value functions and/or values, in an example embodiment described herein.

DETAILED DESCRIPTION

Figure 1:
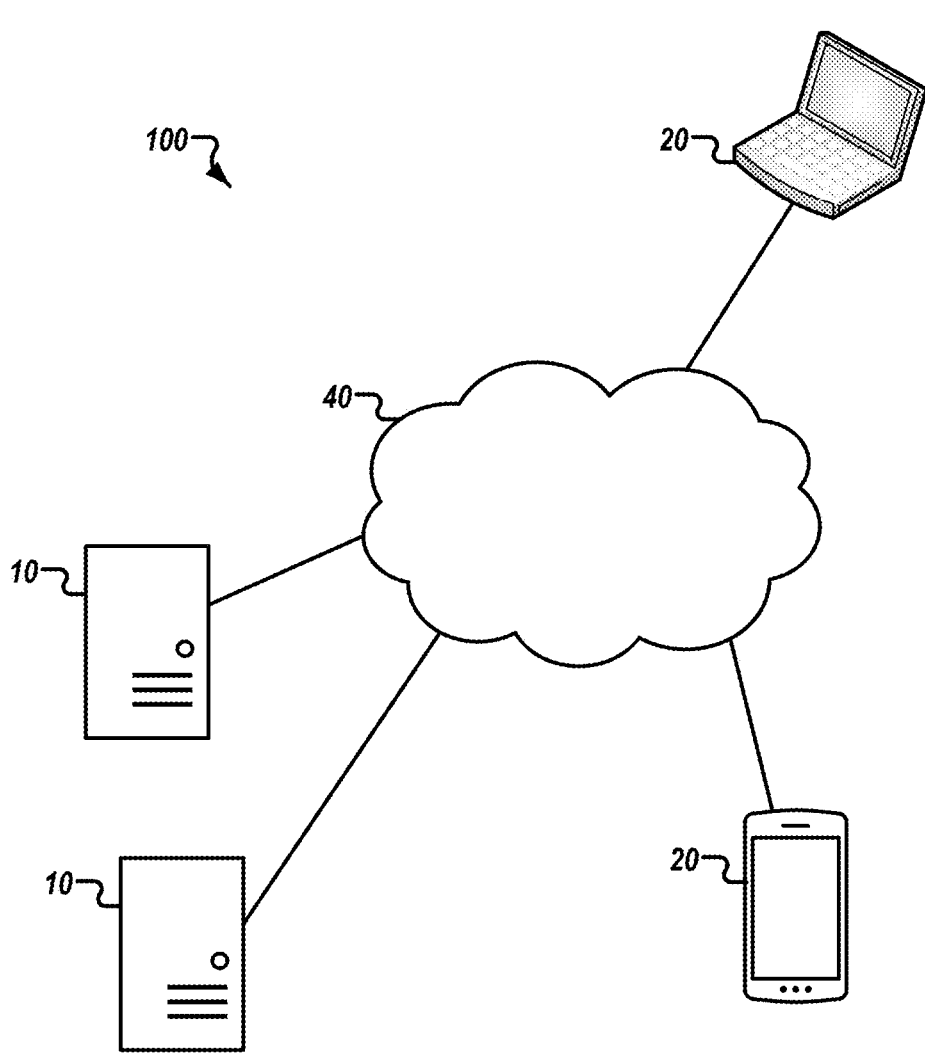
FIG. 1 is a block diagram showing an example architecture of one embodiment described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Where the specification states that a particular component or feature "may," "can," "could," "should," "would," "preferably," "possibly," "typically," "optionally," "for example," "often," "exemplary," or "might" (or other such language) be included or have a characteristic, that particular component or feature is not required to be included or to have the characteristic. Such terminology is intended to convey that the particular component or feature is included in some embodiments while excluded in others, or has the characteristic in some embodiments while lacking the characteristic in others.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessary to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) an application hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

Overview

Various embodiments provide methods, systems, apparatuses, and/or computer program products for the efficient determination of solutions for path wise values for problems associated with a non-linear generator. Various embodiments relate to addressing various non-linear problems such as aircraft wing frequency response in the vicinity of a harmonic frequency of the aircraft wing, animal population monitoring and prediction, analysing limit cycles, weather prediction, analysing chaotic systems, and/or addressing other non-linear systems. For example, various embodiments correspond to determining an initial value and/or one or more intermediate values corresponding to a composite object comprising a plurality of items, wherein different items may be associated with and/or evolve in time in accordance with different rates. For purposes of illustration, various embodiments will be described herein as relates to determination of a portfolio value for a portfolio comprising a plurality of items that may have different rates. For example, the composite object may be a portfolio comprising a plurality of items, such as financial instruments. It should be understood that the composite object may be various other objects, as appropriate for the non-linear problem being addressed.

For example, various embodiments provide methods, systems, apparatuses, and/or computer program products for the efficient determination of a value corresponding to a composite object comprising a plurality of items (e.g., a value corresponding to a portfolio comprising a plurality of items) having differential rates at various points in time. For example, various embodiments provide methods, systems, apparatuses, and/or computer program products for determining the value of a portfolio having differential rates (e.g., different interest rates for lending and borrowing of cash as provided by different financial instruments (loans, credit accounts, repos, etc.)) for fixed values for or sets of initial items or variable values for or sets of initial items. Various embodiments are configured to determine and provide the value of a portfolio having differential rates at one or more points in time in real time or near real time with respect to receiving a corresponding request.

Various embodiments provide an interactive user interface (IUI) through which a user may cause a request for value determination to be provided and through which a user may be provided a graphical and/or tabular representation of portfolio values for one or more portfolios at one or more points in time. In an example embodiment, the portfolio value at a point of time is provided as an upper and lower bound for the portfolio value at that point in time. As should be understood, various embodiments provide a value for path wise values at various points of time for various paths corresponding to a non-linear generator function. As noted above, a value of a portfolio with differential rates is only one example of such a value corresponding to a composite object that may be determined in accordance with various embodiments.

In various embodiments, the path wise values (e.g., the value of the portfolio or other composite object having differential rates at various points in time) are determined using a backward deep neural network (DNN) solver. In various embodiments, the problem for determining the path wise values may be posed as a partial differential equation (PDE) and/or an equivalent forward backward stochastic differential equation (FBSDE). In various embodiments, the backward DNN solver, through deep learning, is trained to determine one or more values of the path wise values as functions of an underlying set of objects or items. For example, in the portfolio with differential rates example, the underlying set of objects or items may be the assets of the portfolio and a plurality of paths describing various evolutions of the underlying set of assets may be determined. The backward DNN solver may use these paths to learn, as a function of the underlying set of objects or items, the value of the portfolio at various points in time. In various embodiments, the DNN of the backward DNN solver comprises a plurality of sub-nets or individual DNNs, with each sub-net or individual DNN corresponding to a time from a time array (e.g., one of the times for which the path wise values are to be determined). Each of the sub-nets or individual DNNs are trained simultaneously such that the path wise values (e.g., value of the portfolio and/or corresponding to another composite object having differential rates as a function of the underlying set of items) at various points in time are determined through one training instance of the backward DNN solver.

In various embodiments, one training instance of the backward DNN solver comprises a plurality of training iterations. In various embodiments, a training iteration of the backward DNN solver comprises determining a final value of the portfolio having differential rates at a final time in a time array and projecting the value of the portfolio backward in time, through one or more intermediate values corresponding to one or more intermediate times of the time array, back to an initial value of the portfolio corresponding to an initial time of the time array. This backward projection is performed along a plurality of paths (e.g., Monte Carlo paths) and sets of initial values and intermediate values of the portfolio are determined therefrom. A statistical measure of spread (e.g., variance, standard deviation, and/or the like as represented by the loss function) for the set of initial values or for a difference between each initial value of the set of initial values and a learned value is determined and the weights and/or parameters of the backward DNN solver are modified to reduce the statistical measure of spread determined on the next training iteration of backward projection for the plurality of paths. Once the backward DNN solver satisfies a convergence requirement (e.g., the statistical measure of spread is sufficiently small and/or the number of training iterations has reached a particular number) the resulting values of the portfolio at the various points in time are provided (e.g., for display to a user via a user computing device, stored in memory for later use, and/or the like). This backward projection of the value of the portfolio provides the basis of the name backward DNN solver. In various embodiments, the DNN of the backward DNN solver comprises a feedforward DNN. For example, the information within the backward DNN solver moves from the input nodes, through the hidden nodes, and out to the output nodes without forming any cycles or loops within the network. In various embodiments, functions for the initial value and intermediate value are determined with the set of underlying assets of the portfolio as the input variables. In other words, the initial values of underlying items (e.g., assets in the example of the portfolio as the composite object) need not be fixed values for each path. For example, different paths may correspond to different initial values of underlying items.

The backward DNN solver allows for efficient determination of values of portfolio having differential rates at various points in time. Moreover, the backward DNN solver enables the initial value of the portfolio to be learned as a function of the initial values of underlying items. Thus, a variety of scenarios of underlying items may be considered with only one training instance of the backward DNN solver. These features are in contrast to traditional means for determining values of a portfolio with differential rates. For example, traditional means for determining values of a portfolio with differential rates are computationally expensive as they require use of a partial differential equation (PDE) finite difference method which are computationally expensive and are only effective for low dimension problems.

Accordingly, the present disclosure sets forth systems, methods, apparatuses, and computer program products that accurately and computationally efficiently determine and provide the value of one or more portfolios having differential rates at various points of time. More generally, various embodiments provide methods, apparatuses, and computer program products that provide path wise values corresponding to a non-linear generator function at various points of time as a function of a set of underlying items or objects. There are many advantages of these and other embodiments described herein. For instance, the computational efficiency of various embodiments of the backward DNN solver described herein allows for the providing of the value of one or more times series (e.g., corresponding to different underlying objects or items) corresponding to a non-linear generator function at various points of time in real time or near real time with respect to the receipt of a request for such. Thus, embodiments of the backward DNN solver may be used to inform decisions on relatively short time frames.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment 100 within which embodiments of the present disclosure may operate to generate and provide values corresponding to composite objects comprising a plurality of items (e.g., portfolios comprising multiple assets) having differential rates at one or more points in time or functions describing the value corresponding to the composite objects having differential rates at various points in time as functions of an underlying set of items and/or IUIs configured for providing such values and/or functions. As illustrated, the example embodiment 100 may include one or more system computing devices 10 and one or more user computing devices 20. The one or more system computing devices and/or one or more user computing devices 20 may be in electronic communication with, for example, one another over the same or different wireless or wired networks 40. For example, a user computing device 20 may provide (e.g., transmit, submit, and/or the like) a request for portfolio values to a system computing device 10 via one or more wireless or wired networks 40. For example, a system computing device may provide (e.g., transmit) composite object values or functions describing composite object values at one or more points in time as a function of a set of underlying items to a user computing entity 20 via one or more wireless or wired networks 40.

The one or more system computing devices 10 may be embodied as one or more servers, such as that described below in connection with FIG. 2. The one or more system computing devices 10 may further be implemented as local servers, remote servers, cloud-based servers (e.g., cloud utilities), or any combination thereof. The one or more system computing devices 10 may receive, process, generate, and transmit data, signals, and electronic information to facilitate the operations of determining and providing path wise values (e.g., composite object values such as portfolio values) and/or functions describing such as a function of a set of underlying objects or items (e.g., assets). In various embodiments, a system computing device 10 may store and/or be in communication with one or more databases. In an example embodiment, the one or more databases may be embodied as one or more data storage devices, such as a Network Attached Storage (NAS) device or devices, or as one or more separate databases or servers. The one or more databases may store information accessed by the system computing device 10 to facilitate the operations of determining and providing path wise values for a composite object (e.g., portfolio) and/or functions describing such as a function of a set of underlying objects or items (e.g., assets). For example, the one or more databases may store control signals, device characteristics, and access credentials for one or more of the user computing devices 20.

Figure 3:
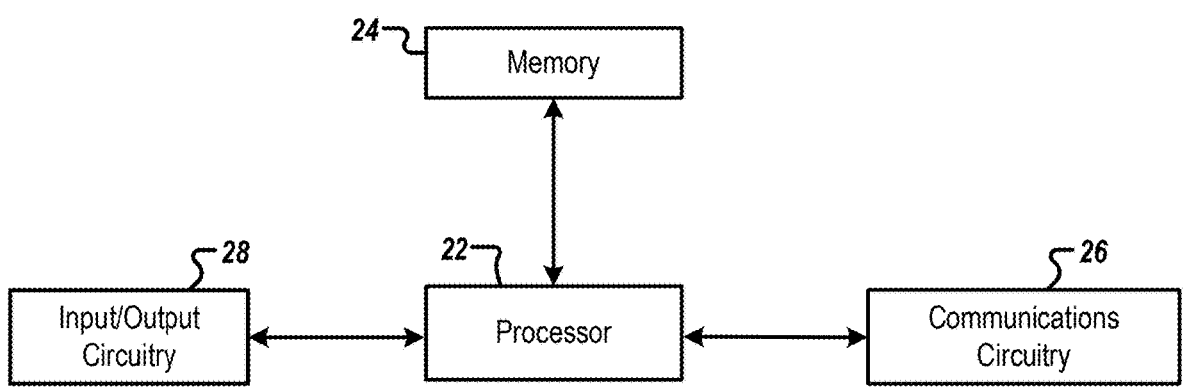
FIG. 3 is a block diagram of a user computing entity that may be specifically configured in accordance with an example embodiment described herein.

The one or more user computing devices 20 may be embodied by any computing devices known in the art, such as those described below in connection with FIG. 3. The system computing device 10 may receive information from, and transmit information to, the one or more user computing devices 20. For example, the system computing device 10 may receive a request for path wise values (e.g., portfolio) values generated and provided by a user computing device 20. For example, the system computing device may provide path wise values (e.g., portfolio) values and/or functions describing such as a function of a set of underlying objects or items (e.g., assets) such that a user computing device 20 receives the path wise values (e.g., portfolio) values and/or functions describing such as a function of a set of underlying objects or items (e.g., assets). It will be understood that in some embodiments, the one or more user computing devices 20 need not themselves be independent devices, but may be peripheral devices communicatively coupled to other computing devices.

Exemplary Computing Devices

The system computing device 10 described with reference to FIG. 1 may be embodied by one or more computing devices or servers, such as the example system computing device 10 shown in FIG. 2. As illustrated in FIG. 2, the system computing device 10 may include processing circuitry 12, memory 14, communications circuitry 16, input-output circuitry 18, solver circuitry 202, and deep neural network (DNN) circuitry 204, each of which will be described in greater detail below. In some embodiments, the system computing device 10 may further comprise a bus (not expressly shown in FIG. 2) for passing information between various components of the system computing device. The system computing device 10 may be configured to execute various operations described above in connection with FIG. 1 and below in connection with FIGS. 4 and 5.

In some embodiments, the processor 12 (and/or co-processor or any other processing circuitry assisting or otherwise associated with the processor) may be in communication with the memory 14 via a bus for passing information among components of the apparatus. The processor 12 may be embodied in a number of different ways and may, for example, include one or more processing devices configured to perform independently. Additionally or alternatively, the processor may include one or more processors configured in tandem via a bus to enable independent execution of software instructions, pipelining, and/or multithreading. The use of the terms "processor" or "processing circuitry" may be understood to include a single core processor, a multi-core processor, multiple processors of the system computing device 10, remote or "cloud" processors, or any combination thereof.

In an example embodiment, the processor 12 may be configured to execute software instructions stored in the memory 14 or otherwise accessible to the processor. Alternatively or additionally, the processor 12 may be configured to execute hard-coded functionality. As such, whether configured by hardware or software methods, or by a combination of hardware with software, the processor 12 may represent an entity (e.g., physically embodied in circuitry) capable of performing operations according to an embodiment of the present invention while configured accordingly. Alternatively, as another example, when the processor 12 is embodied as an executor of software instructions, the software instructions may specifically configure the processor 12 to perform the algorithms and/or operations described herein when the software instructions are executed.

Memory 14 is non-transitory and may include, for example, one or more volatile and/or non-volatile memories. In other words, for example, the memory 14 may be an electronic storage device (e.g., a computer readable storage medium). The memory 14 may be configured to store information, data, content, applications, software instructions, or the like, for enabling the apparatus to carry out various functions in accordance with example embodiments contemplated herein.

The communications circuitry 16 may be any means such as a device or circuitry embodied in either hardware or a combination of hardware and software that is configured to receive and/or transmit data from/to a network and/or any other device, circuitry, or module in communication with the system computing device 10. In this regard, the communications circuitry 16 may include, for example, a network interface for enabling communications with a wired or wireless communication network. For example, the communications circuitry 16 may include one or more network interface cards, antennas, buses, switches, routers, modems, and supporting hardware and/or software, or any other device suitable for enabling communications via a network 40. Additionally or alternatively, the communication interface 16 may include the circuitry for causing transmission of such signals to a network or to handle receipt of signals received from a network.

In some embodiments, the system computing device 10 may include input/output circuitry 18 in communication configured to provide output to a user and, in some embodiments, to receive an indication of user input. The input/output circuitry 18 may comprise a user interface, such as a display, and may further comprise the components that govern use of the user interface, such as a web browser, mobile application, dedicated client device, or the like. In some embodiments, the input/output circuitry 18 may additionally or alternatively include a keyboard, a mouse, a touch screen, touch areas, soft keys, a microphone, a speaker, and/or other input/output mechanisms or devices. The input/output circuitry 18 may utilize the processor 12 to control one or more functions of one or more of these user interface elements through software instructions (e.g., application software and/or system software, such as firmware) stored on a memory (e.g., memory 14) accessible to the processor 12.

In addition, the system computing device 10 further comprises solver circuitry 202, which includes hardware components designed for acting as a deep learning-based BSDE solver (e.g., backward DNN solver). The solver circuitry 202 may utilize processor 12, memory 14, or any other hardware component included in the system computing device 10 to perform these operations, as described in connection with FIGS. 4 and 5 below. The solver circuitry 202 may further utilize communications circuitry 16 to receive composite object (e.g., portfolio) values requests and/or provide composite object values and/or functions describing such as a function of a set of underlying objects or items (e.g., assets) (e.g., in response to a request therefor), or may otherwise utilize processor 12 and/or memory 14 to access information/data and/or executable instructions (e.g., software) used to determine composite object values and/or functions describing such as a function of a set of underlying objects or items (e.g., assets) and/or to store composite object values and/or functions describing such as a function of a set of underlying objects or items (e.g., assets), and/or the like. In an example embodiment, the functionality described herein as being performed by the solver circuitry 202 is performed through the execution executable instructions by the processor 12. In an example embodiment, the solver circuitry 202 comprises one or more graphical processing units (GPUs).

In addition, the system computing device 10 further comprises DNN circuitry 204, which includes hardware components designed for training and/or operating a DNN. The DNN circuitry 204 may utilize processor 12, memory 14, or any other hardware component included in the system computing device 10 to perform these operations, as described in connection with FIG. 4 below. The DNN circuitry 204 may further utilize processor 12 and/or memory 14 to access information/data and/or executable instructions for determining, providing, and/or storing one or more composite object values and/or functions describing such as a function of a set of underlying objects or items, adjust network weights (e.g., parameters of the functions describing the composite object values as a function of a set of underlying objects or items) through the minimization and/or reduction of a loss function, and/or the like. In an example embodiment, the functionality described herein as being performed by the DNN circuitry 202 is performed through the execution executable instructions by the processor 12. In an example embodiment, the DNN circuitry 204 comprises one or more graphical processing units (GPUs).

Although these components 12-18 and 202-204 may in part be described using functional language, it will be understood that the particular implementations necessarily include the use of particular hardware. It should also be understood that certain of these components 12-18 and 202-204 may include similar or common hardware. For example, the solver circuitry 202 and DNN circuitry 204 may each at times leverage use of the processor 12 or memory 14, but duplicate hardware is not required to facilitate operation of these distinct components of the system computing device 10 (although duplicated hardware components may be used in some embodiments, such as those in which enhanced parallelism may be desired). The use of the term "circuitry" as used herein with respect to components of the model computing device 10 therefore shall be interpreted as including the particular hardware configured to perform the functions associated with the particular circuitry described herein. Of course, while the term "circuitry" should be understood broadly to include hardware, in some embodiments, the term "circuitry" may refer also to software instructions that configure the hardware components of the model computing entity 10 to perform their various functions.

To this end, each of the communications circuitry 16, input/output circuitry 18, solver circuitry 202 and DNN circuitry 204 may include one or more dedicated processors, specially configured field programmable gate arrays (FPGA), and/or application specific interface circuit (ASIC) to perform its corresponding functions, these components may additionally or alternatively be implemented using a processor (e.g., processor 12) executing software stored in a memory (e.g., memory 14). In this fashion, the communications circuitry 16, input/output circuitry 18, solver circuitry 202, and DNN circuitry 204 are therefore implemented using special-purpose components implemented purely via hardware design or may utilize hardware components of the system computing device 10 that execute computer software designed to facilitate performance of the functions of the communications circuitry 16, input/output circuitry 18, solver circuitry 202, and DNN circuitry 204.

The user computing device 20 described with reference to FIG. 1 may be embodied by one or more computing devices, personal computers, desktop computers, client devices (e.g., of the system computing device 10), and/or mobile devices, such as the example user computing device 20 shown in FIG. 3. The illustrated example user computing device 20 includes processing circuitry and/or processor 22, memory 24, communications circuitry 26, and input-output circuitry 28, each of which is configured to be similar to the similarly named components described above in connection with FIG. 2. In various embodiments, the processor 22, memory 24, and input-output circuitry 28 are configured to provide an IUI configured for user interaction (e.g., via the input-output circuitry 28). For example, the IUI may be configured to receive user input initiating a composite object values request and/or to provide composite object values.

In some embodiments, various components of the system computing device 10 and/or user computing device 20 may be hosted remotely (e.g., by one or more cloud servers) and thus need not physically reside on the corresponding computing device 10, 20. Thus, some or all of the functionality described herein may be provided by third party circuitry. For example, a given computing device 10, 20 may access one or more third party circuitries via any sort of networked connection that facilitates transmission of data and electronic information between the computing device 10, 20 and the third party circuitries. In turn, that computing device 10, 20 may be in remote communication with one or more of the other components describe above as comprising the computing device 10, 20.

As will be appreciated based on this disclosure, example embodiments contemplated herein may be implemented by a system computing device 10 and/or user computing device 20. Furthermore, embodiments may take the form of a computer program product on at least one non-transitory computer-readable storage medium (e.g., memory 14, 24) storing software instructions. Any suitable non-transitory computer-readable storage medium may be utilized, some examples of which are non-transitory hard disks, CD-ROMs, flash memory, optical storage devices, and magnetic storage devices. It should be appreciated, with respect to certain system computing devices 10 as described in FIG. 2 or user computing devices 20 as described in FIG. 3, that loading the software instructions onto a computer or apparatus produces a special-purpose machine comprising the means for implementing various functions described herein.

Having described specific components of example system computing devices 10 and user computing devices 20, example embodiments are described below in connection with FIGS. 4-8.

Example Backward DNN Solver

In various embodiments, a backward DNN solver is used to determine the path wise values and/or values corresponding to a composite object and/or functions describing such as a function of a set of underlying objects or items at one or more points in time. In various embodiments, the path wise values corresponds to a non-linear generator function $f$. For example, the non-linear generator function $f$ may have different forms depending on various criteria which are used to divide the value space into different cases/regions. For example, if the value of the path wise values at a particular time satisfies a first criteria, that value is in a first region of the value space and the evolution from the particular time to the immediately preceding time (as the times series value is determined by stepping backward through time) may be evaluated using a first form of the non-linear generator function. When the value of the path wise values at the particular time does not satisfy the first criteria (or satisfies a second criteria), that value is in a second region of the value space and the evolution from the particular time to the immediately preceding time may be evaluated using a second form of the non-linear generator function.

In various embodiments, the initial values of underlying items corresponding to the path wise values are fixed for all paths considered by the backward DNN solver. In various embodiments, the initial values of underlying items corresponding to the path wise values are not fixed and may be different for different paths considered by the backward DNN solver. This enables the value of the composite object at a point in time to be learned as a function of the initial set of underlying objects or items such that various composite objects may be considered based on one training instance of the backward DNN solver.

In various embodiments, a backward DNN solver having a non-linear generator is provided. In various embodiments, a backward DNN solver having a non-linear generator is used to determine a solution for a non-linear problem. For example, a backward DNN solver having a non-linear generator may be used to determine a value of a composite object (e.g., a portfolio) having differential rates at one or more points in time. In particular, to perform the backward time step operation performed by the backward DNN solver, a non-linear equation needs to be solved. In various embodiments, the backward time step problem is solved in an exact manner or using a Taylor series approximation.

The main idea of the backward DNN solver technique is that the backward DNN solver determines a solution for a backward stochastic differential equation (BSDE) by starting a final time T (e.g., a maturity time) with a given final value and then time-stepping backward until a given initial time $t_0$ to determine an initial value $X_0$ of a time continuous stochastic process $X_t$. In the case of the time-continuous dynamics where the item value X at the initial time $t_0$ has a fixed initial value $X_0$, all realizations of the value of the composite object $Y_0$ at the initial time $t_0$ should have the same value. Thus, a measure of the size of the range (variance in this particular case) of $Y_0$ may be the objective function and the variance of a mini-batch may be determined using mini-batch stochastic gradient descent. For the case of random initial item value $X_0$, the square distance from an also to-be-determined yinit($X_0$) represented by a DNN may be minimized. This function is also the predictable adapted $L^2$-projection of the values obtained from the path-wise backward time step.

While various embodiments may be used to determine solutions to a variety of non-linear time evolution problems, the particular non-linear pricing problem described in detail herein considers the case of differential rates together with Black-Scholes forward dynamics for European option pricing problem, involving, for example, a linear combination of two calls with coefficients with opposite signs. Differential rates mean that positive cash balances in the trading strategy accrue interest at a lending rate while negative cash balances (e.g., debts, loans, and/or the like) accrue interest at a borrowing rate, with the lending rate being different from the borrowing rate. For example, the borrowing rate may be higher than the lending rate.

One example type of non-linear partial differential equations (PDEs) that may be addressed by an embodiment of the backward DNN solver described herein have the general form:

$$u_t(t, x) + L_t u(t, x) + f(t, x, u(t, x), \nabla u(t, x)) = 0 \quad (1)$$

with $$L_t u(t, x) := \frac{1}{2} Tr\big(\sigma_N \sigma_N^T(t, x)(Hess_x u)(t, x)\big) + \mu(t, x)\nabla u(t, x), \quad (2)$$

where $Hess_x u$ is the Hessian matrix, with terminal condition at final time T (e.g., maturity) given as $$u(T,x)=g(x), \quad (3)$$

wherein u(t, x) is the payoff replication value at time t which represents the needed wealth at time t to exactly or approximately replicate the payoff when the portfolio starts with item value $X_t$ at time t, $f(t, x, u(t, x), \nabla u(t, x))$ is a non-linear generator function, $\nabla u(t, x)$ is the gradient of the payoff replication value at time t(t, x), $\sigma_N$ is the N×N diffusion coefficient matrix or the normal volatility, $$\sigma_N^T$$

is the transpose of the N×N diffusion coefficient matrix or the normal volatility, and $\mu(t, x)$ is the drift coefficient. A non-linear Feyman-Kac theorem shows the solution of a PDE in accordance with Equation 1 also satisfies the following forward backward stochastic differential equation (FBSDE) system under appropriate assumptions:

The forward stochastic differential equation (FSDE) describing the underlying assets:

$$dX_t=\mu(t,X_t)dt+\sigma_N(t,X_t)dW_t, \quad (4)$$

where $dW_t$ is a standard Wiener process with zero mean and unite rate of variance (e.g., Standard Brownian motion), and the backward stochastic different equation (BSDE) in terms of the coefficient of the Brownian motion $Z_t$:

$$-dY_t = f_z(t, X_t, Y_t, Z_t)dt - Z_t^T dW_t, \quad (5)$$

or in terms of the gradient measure $\Pi_t$:

$$-dY_t = f(t, X_t, Y_t, \Pi_t)dt - \Pi_t^T \sigma_{LN}(t, X_t)dW_t \quad (6)$$

with terminal condition $$Y_T=g(X_T), \quad (7)$$

where $$Y_t = u(t, X_t), \Pi_t = \nabla_x u(t, X_t), \text{ and } Z_t = \sigma_{LN}^T(t, X_t)\Pi_t. \quad (8)$$

In terms of the example pricing application, $Y_T=g(X_T)$ is the final payoff of the European option that one tries to replicate with a self-financing portfolio having the underlying asset(s) X, and a remaining cash position. That portfolio will contain a value $\pi_i(t)$ worth of item $X_i(t)$, where $\pi_i(t)$ is the ith component of the vector $\Pi_t$ and $X_i(t)$ is the ith item of the vector of the item value vector $X_t$. the portfolio (including cash position) is worth $Y_t$ at time t. The portfolio may also be described as comprising $\pi_i(t)X_i(t)$ worth of item $X_i(t)$ when the assets are measured by size or volume.

Now $Y_t$, or equivalently u(t, x) (i.e., $Y_t=u(t, x)$), represents the needed wealth at time t to exactly or approximately replicate the payoff when starting at item value vector $X_t$ at time t. This gives one of the possible ways to define price (pricing by replication): price(t, $Xt \mapsto g(X_T)$) as the solution of the FBSDE and/or the non-linear PDE. Linear pricing stratifies (among other things)

$$\text{price}(t, X_t \mapsto g(X_T)) = -\text{price}(t, X_t \mapsto -g(X_T)). \quad (9)$$

However, in non-linear pricing in general (as for instance for differential rates, and in other examples), these two prices are no longer necessarily the same or equal, but will give an upper and a lower price bound. For example, price(t, $X_t \mapsto g(X_T)$) and price(t, $X_t \mapsto -g(X_T)$) may provide upper and lower bounds of price(t, $X_t$) in non-linear pricing situations.

As noted above, the backward DNN solver steps backward through time from a final time T (e.g., maturity of the instrument/portfolio to be valued and/or risk-managed) to an initial time to. In order to step backward through time, the time period under consideration (e.g., the time period between the initial time $t_0$ and the final time T) may be discretized. For example, the Euler-Maruyama method may be used to discretize time in the forward direction for both $X_t$ and $Y_t$ as $$X_{t_{i+1}} = X_{t_i} + \mu(t_i, X_{t_i})\Delta t_i + \sigma(t_i, X_{t_i})\Delta W^i \quad (10)$$

and $$Y_{t_{i+1}} = Y_{t_i} - f(t_i, X_{t_i}, Y_{t_i}, \Pi_{t_i})\Delta t_i + \Pi_{t_i}^T \sigma(t_i, X_{t_i})\Delta W^i, \quad (11)$$

where $\Delta t_i = t_{i+1} - t_i$ and $\Delta W^i = W_{t_{i+1}} - W_{t_i}$, and the superscript T denotes the transpose of the corresponding matrix or vector.

In various embodiments, an analytical solution for the non-linear generator function $f$ is used. An analytical solution to solving a non-linear problem may be found by rewriting equation 11 as $$Y_{t_i} - f(t_i, X_{t_i}, Y_{t_i}, \Pi_{t_i})\Delta t_i = Y_{t_{i+1}} - \Pi_{t_i}^T \sigma(t_i, X_{t_i})\Delta W^i \quad (12)$$

and solve for $Y_{t_i}$.

For a non-linear problem that is a differential rates problem using a risk neutral measure, the non-linear generator function $f$ in the BSDE is $$f(t, X_t, Y_t, Y_t, \Pi_t) = -r^l(t)Y_t + (r^b(t) - r^l(t))\left(\sum_{j=1}^n \pi_j(t) - Y_t\right)^+. \quad (13)$$

Here n is the number of items (or rows) in $X_t$, $r^l(t)$ is a risk neutral rate at time t (e.g., a lending interest rate), and $r^b(t)$ is a borrowing interest rate at time t. In various scenarios, $r^b(t) \geq r^l(t)$. This form of the non-linear generator function $f$ expresses that all items $X_i(t)$ and positive cash balances grow at a risk neutral rate $r^l(t)$ unless the cash position $$Y_t - \sum_{j=1}^n \pi_j(t)$$

is negative, and then that negative cash balance will grow at a rate $r^b(t)$ corresponding to the borrowing rate as compared to the lower or equal lending rate.

There are two cases for equation (13). For example, equation (13) defines criteria that may be used to partition the value space into two regions, with each region corresponding to a different from of the non-linear generator function $f$. In the first case, $$\sum_{j=1}^n \pi_j(t) > Y_t.$$

In which case the non-linear generator function has the form:

$$f(t, X_t, Y_t, Y_t, \Pi_t) = -r^l(t)Y_t + (r^b(t) - r^l(t))\left(\sum_{j=1}^n \pi_j(t) - Y_t\right). \quad (14)$$

Inserting equation (14) into equation (12) and solving for $Y_{t_i}$ gives the backward time step equation for this first case/ region as:

$$Y_{t_i} = \frac{Y_{t_i} + (r^b(t_i) - r^l(t_i))\left(\sum_{j=1}^n \pi_j(t_i)\right)\Delta t_i - \prod_{t_i}^T \sigma(t_i, X_{t_i})\Delta W^i}{1 + r^b(t_i)\Delta t_i}. \quad (15)$$

In the second case, $$\sum_{j=1}^n \pi_j(t) \leq Y_t.$$

In which case is non-linear generator function has the form:

$$f(t, X_t, Y_t, \Pi_t) = -r^l(t)Y_t. \quad (16)$$

Inserting equation (16) into equation (12) gives the backward time step equation for this second case/region as:

$$Y_{t_i} = \frac{Y_{t_{i+1}} - \prod_{t_i}^T \sigma(t_i, X_{t_i})\Delta W^i}{1 + r^l(t_i)\Delta t_i}. \quad (17)$$

However, $Y_{t_i}$ is not known before solving the non-linear equation (12), therefore making the determination of which criteria a particular $Y_{t_i}$ satisfies (and thus which form of the backward time step equation to use to determine $Y_{t_i}$) difficult. From equations (15) and (17) and the criteria/conditions involving $Y_{t_i}$, which define the two cases/regions, it is determined that the criteria/condition $$Y_{t_i} < \sum_{j=1}^n \pi_j(t_i)$$

(corresponding to the first case) is equivalent to $$Y_{t_{i+1}} < \left(\sum_{j=1}^n \pi_j(t_i)\right)\{\sigma(t_i, X_{t_i})\Delta W^i + (1 + r^l(t_i))\Delta t_i\} \quad (18)$$

and the relation for case/region two may be similarly determined. Thus, if equation (18) is satisfied, equation (15) is used for determining the backward time step equation to be used for determining $Y_{t_i}$ based (at least in part) on $Y_{t_{i+1}}$ and otherwise equation (17) is used for determining the backward time step equation to be used for determining $Y_{t_i}$ based (at least in part) on $Y_{t_{i+1}}$.

In various embodiments, a Taylor expansion approximation of the non-linear generator function $f$ is used. A first order Taylor expansion of the non-linear generator function $f$ is given by:

$$f\left(t_i, X_{t_i}, Y_{t_i}, \prod_{t_i}^T \sigma(t_i, X_{t_i})\right) \approx \quad (19)$$

$$f\left(t_i, X_{t_i}, Y_{t_{i+1}}, \prod_{t_i}^T \sigma(t_i, X_{t_i})\right) - \frac{\partial f}{\partial Y}\left(t_i, X_t, Y_{t_{i+1}}, \prod_{t_i}^T \sigma(t_i, X_{t_i})\right)\Delta Y_t^{\Delta t}.$$

Inserting equation (19) into equation (12) and solving for $Y_{t_i}$ provides:

$$Y_{t_i} = Y_{t_{i+1}} + \frac{f\left(t_i, X_{t_i}, Y_{t_{i+1}}, \prod_{t_i}^T \sigma(t_i, X_{t_i})\right)\Delta t_i - \prod_{t_i}^T \sigma(t_i, X_{t_i})\Delta W^i}{1 - \frac{\partial f}{\partial Y}\left(t_i, X_{t_i}, Y_{t_{i+1}}, \prod_{t_i}^T \sigma(t_i, X_{t_i})\right)\Delta t_i} \quad (20)$$

where $f$ and $$\frac{\partial f}{\partial Y}$$

are both evaluated at $Y_{t_{i+1}}$.

For the same differential rates problem described above, it is clear that the same two cases, and thus two forms of the non-linear generator function $f$, exist. Thus, for the first case/region, when criteria/condition $$\sum_{j=1}^n \pi_j(t_i) > Y_{t_{i+1}}$$

is satisfied, the non-linear generator function has the form:

$$f\left(t_i, X_{t_i}, Y_{t_{i+1}}, \prod_{t_i}\right) = \quad (21)$$

$$-r^l(t_i)Y_{t_{i+1}} + \left(r^b(t_i) - r^l(t_i)\right)\left(\sum_{j=1}^n \pi_j(t_i) - Y_{t_{i+1}}\right)$$

and $$\frac{\partial f}{\partial Y} = -r^b(t_i). \quad (22)$$

Inserting equations (21) and (22) into equation (20) gives a first form of the backward time step equation for the first case/region as:

$$Y_{t_i} = \frac{Y_{t_{i+1}} + \left(r^b(t_i) - r^l(t_i)\right)\left(\sum_{j=1}^n \pi_j(t_i)\right)\Delta t_i - \prod_{t_i}^T \sigma(t_i, X_{t_i})\Delta W^i}{1 + r^b(t_i)\Delta t_i}. \quad (23)$$

For the second case/region, when criteria/condition $$\sum_{j=1}^n \pi_j(t_i) \le Y_{t_{i+1}}$$

is satisfied, the non-linear generator function has the form:

$$f\left(t_i, X_{t_i}, Y_{t_{i+1}}, \prod_{t_i}\right) = -r^l(t_i)Y_{t_{i+1}} \quad (24)$$

and $$\frac{\partial f}{\partial Y} = -r^l(t_i). \quad (25)$$

Inserting equations (24) and (25) into equation (20) gives a second form of the backward time step equation for the second case/region as:

$$Y_{t_i} = \frac{Y_{t_{i+1}} - \prod_{t_i}^T \sigma(t_i, X_{t_i})\Delta W^i}{1 + r^l(t_i)\Delta t_i}. \quad (26)$$

As can be seen, equations (15) and (23), corresponding to the first case for both the analytical solution and the Taylor expansion approximation, are the same and equations (17) and 26), corresponding to the second case for both the analytical solution and the Taylor expansion approximation, are the same. The only difference between the analytical solution framework and the Taylor expansion approximation framework is in the conditions as to when each case is applied.

As indicated above, in various embodiments, the value of $Y_{t_i}$, the value of Y at time $t_i$, is found by stepping backward through time. For example, the value of Y at the initial time $t_0$ is found by stepping backward through time from $Y_T = g(X_T) = u(T, X_T)$ to $Y_{t_0}$. To accomplish this task, the values of $X_t$ are first determined by stepping through equation (10) forward in time from $X_{t_0}$ to $X_T$. As described above, an analytical solution or a Taylor expansion approximation may be used to time step Y backward to determine $Y_{t_0}$ and the intermediate values $Y_{t_i}$.

In various embodiments, the initial asset value vector $X_0$ is fixed. In such embodiments, the backward DNN solver may use the loss function $L = \text{var}(Y_0)$. For the mini-batch stochastic gradient step, the loss function will be the mini-batch variance $$L \propto E(\|Y_0 - \overline{Y}_0\|^2), \quad (27)$$

where $\overline{Y}_0$ is the mean value of $Y_0$ over the mini-batch. For embodiments using Monte Carlo estimates for $Y_0$, the previous mini-batch mean may be used as $\overline{Y}_0$ or the mean $Y_0$ may be computed over a larger sample of paths having a fixed trading strategy.

In various embodiments, instead of using the mini-batch mean in the loss function, $\overline{Y}_0$ may be learned as a parameter or variable, which results in the same loss function as shown in equation (27), but with a different interpretation of $\overline{Y}_0$, where $\overline{Y}_0 = Y_{init}$, where $Y_{init}$ is a parameter or variable that is learned as part of the deep learning process of the backward DNN solver.

In various embodiments, the initial asset value vector $X_0$ is randomly selected for each path. In such embodiments, the batch variance cannot be used in a straightforward way and $\overline{Y}_0 = Y_{init}$ is used such that the loss function is $$L \propto E(\|Y_0 - Y_{init}(X_0)\|^2), \quad (28)$$

where $Y_{init}(X_0)$ is a function represented by a DNN which is learned as part of the deep learning of the backward DNN solver.

In various embodiments, additional terms may be added to the loss function such that the value of $Y_{t_i}$ can be learned at various time steps $t_i$. This provides the advantage that not only can the initial value $Y_0$ be learned, but in the same learning instance, the value $Y_{t_i}$ may be learned for one or more instances of time $t_i$. For example, additional terms of the form $$E(\|Y_{t_i} - Y_{learned_i}(X_{t_i})\|^2) \quad (29)$$

may be added to the loss function for some or all intermediate times $t_i$ to learn approximations for the solution function $Y_{learned_i}(X_{t_i})$.

In general, for each path, the asset value vector $X_t$ is simulated from the initial time $t_0$ to the final time T, such that the item value vectors $X_{t_0}, \ldots, X_{t_i}, \ldots, X_T$ are determined for the path. Then $Y_T$ is set equal to $g(X_T)=u(T, X_T)$ and the values of Y are solved for iterating backward in time from $Y_T$ at the final time to $Y_{t_0}$ at the initial time. The loss function may be applied to a mini-batch (or batch) of paths and the parameters of the functions $Y_{init}(X_0)$ and any $Y_{learned_i}(X_{t_i})$ may be adjusted accordingly until functions converge as indicated by minimizing the loss function.

As should be understood, the backward DNN solver learns to approximate the functions describing the value of $Y_{t_i}$ for various times $t_i$ (including the initial time $t_0$) as a function of the underlying asset value vector X via the adjustment, modification, refinement, and/or the like of the weights and/or parameters $\{\theta_i\}_{0 \le i \le m}$ of the backward DNN solver. For example, the weighs and/or parameters $\{\theta_i\}_{0 \le i \le m}$ of the backward DNN solver may correspond to parameters of the functions describing the value of $Y_{t_i}$ for various times $t_i$ (including the initial time $t_0$) as a function of the underlying item value vector X. Thus, the initial value of the portfolio, the value of the portfolio at various other points of time, and the dependence of the portfolio value at a point in time based on the underlying set of objects or items (e.g., assets) are not determined based on model assumptions, but are rather determined through the trained backward DNN solver.

Figure 4:
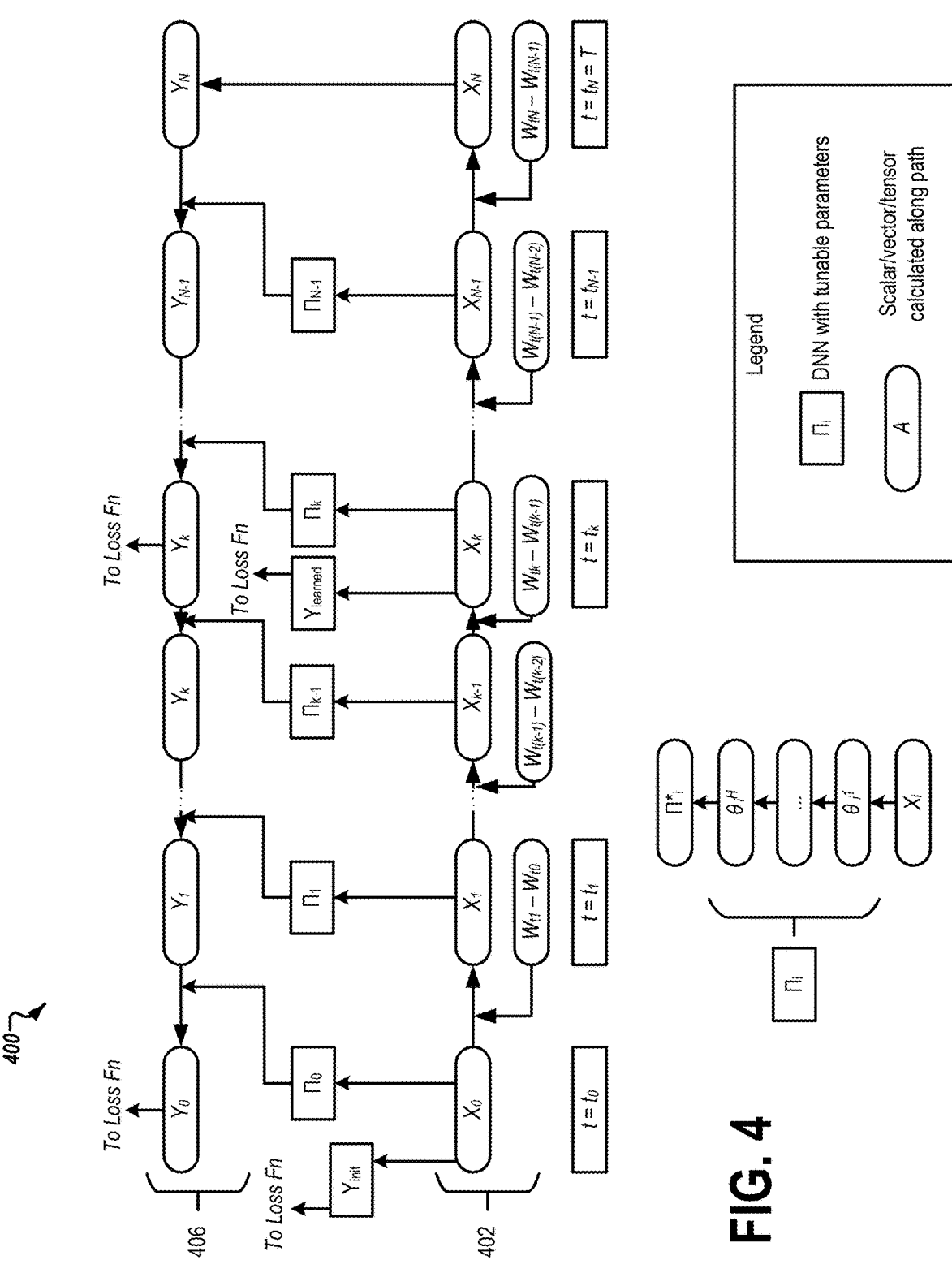
FIG. 4 is a block diagram showing an example architecture of a backward stochastic differential equation (BSDE) based backward deep neural network (DNN) solver for determining value functions and/or values, in accordance with an example embodiment described herein.

FIG. 4 provides a block diagram showing an example architecture of a backward DNN solver 400, in accordance with an example embodiment described herein. A portfolio path 402, given by $X_{t_0}, \ldots, X_{t_i}, \ldots, X_T$ or $\{X(t_i)_{0 \le i \le N}\}$, where N is the number of time steps between the initial time $t_0$ and the final time $t_N=T$, is defined based on an initial set of underlying objects or items (e.g., assets) $X_{t_0}$, diffusion and drift coefficients, and the Brownian motion path $\{W(t_i)_{0 \le i \le N}\}$ evolving forward in time (e.g., iterating through $t_i$ to $t_{i+1}$). The input layers of the DNNs $\Pi_i$ are configured to receive a corresponding set of underlying objects or items $X_{t_i}$ of the portfolio path $\{X(t_i)_{0 \le i \le N}\}$. A value path 406, given by $Y_{t_0}, \ldots, Y_{t_i}, \ldots, Y_T$ or $\{Y_{t_i}\}_{0 \le i \le N}$ is determined by iterating backward through time from $Y_T$ through $Y_{t_i}$ for each intermediate time $t_i$, to $Y_{t_0}$ at the initial time $t_0$. A DNN $\Pi_i$ comprises H hidden layers, each corresponding to weights and/or parameters $\{\theta_i\}_{0 \le i \le N}$ of the backward DNN solver. In various embodiments, a DNN $\Pi_i$ comprises one to ten hidden layers (e.g., four hidden layers). In various embodiments, a DNN IIi may receive a corresponding set of underlying objects or items $X_{t_i}$ as input (e.g., via an input layer of the DNN IIi) and provide as output an expression, scalar value, vector, or tensor $\Pi^*_i$ (e.g., via an output layer of the DNN $\Pi_i$). In various embodiments, the expression, scalar value, vector, or tensor $\Pi^*_i$ may be used in the backward iterations of the value path 406. As shown in FIG. 4, functions $Y_{init}(X_0)$ and any $Y_{learned_i}(X_{t_i})$ and corresponding values form the value path 406 (e.g., $Y_0$ and $Y_k$) may be provided as input to the loss function.

As can be seen from FIG. 4, the backward DNN solver includes three types of connections. The first type of connection, $(X_i, W(t_{i+1})-W(t_i)) \rightarrow X_{t_{i+1}}$ is characterized by equation (10) and a discretization scheme (e.g., Euler-Maruyama discretization, and/or the like). The second type of connection, $Y_{i+1} \rightarrow Y_{t_i}$ is completely characterized by equation (11) in general (e.g., equations (15) and (17) or (20) and (23), in the portfolio with differential rates example). Thus, there are no weights and/or parameters to be optimized for the first and second types of connection. A third type of connection corresponds to the sub-net or individual DNNs $\{\Pi_i\}_{0 \le i \le N-1}$. This third type of connection is the multilayer feedforward neural network (e.g., subnet or individual DNN) of the backward DNN solver 400 approximating and/or configured to learn a function describing the portfolio value $Y_{t_i}$ as a function of the item value vector $X_{t_i}$, which describes the underlying objects or items (e.g., assets) of the portfolio, at time $t_i$. The weights and/or parameters $\theta_i$ of these sub-nets or individual DNNs are optimized through the minimization of the loss function. Examples of the loss function are described above with respect to equations (27)-(29). In particular, the weights and/or parameters $\theta_i$ describe and/or control the linear/nonlinear transformation from the input layers to the first hidden layer, between the hidden layers, and from the last hidden layer to the output layer of the corresponding sub-net and/or individual DNN. The weights and/or parameters $\theta_i$ include may involve batch-normalization parameters involved in the process as well, in an example embodiment. In various embodiments, sub-nets and/or individual networks configured to learn the value of $Y_{learned_i}(X_{t_i})$ may also be included in the backward DNN solver and may provide an output that is used as input for the loss function.

A marked advantage of the backward DNN solver, compared to traditional methods that determine an initial value $Y_{t_0}$ and then project the price forward in time to determine the value of the portfolio at future points in time, is the ability to determine the value at various points in time as a function of the underlying objects or items of the portfolio. This further enables the backward DNN solver to be used for portfolios comprising various instruments with various rates.

Example Operation of a System Computing Device

Figure 2:
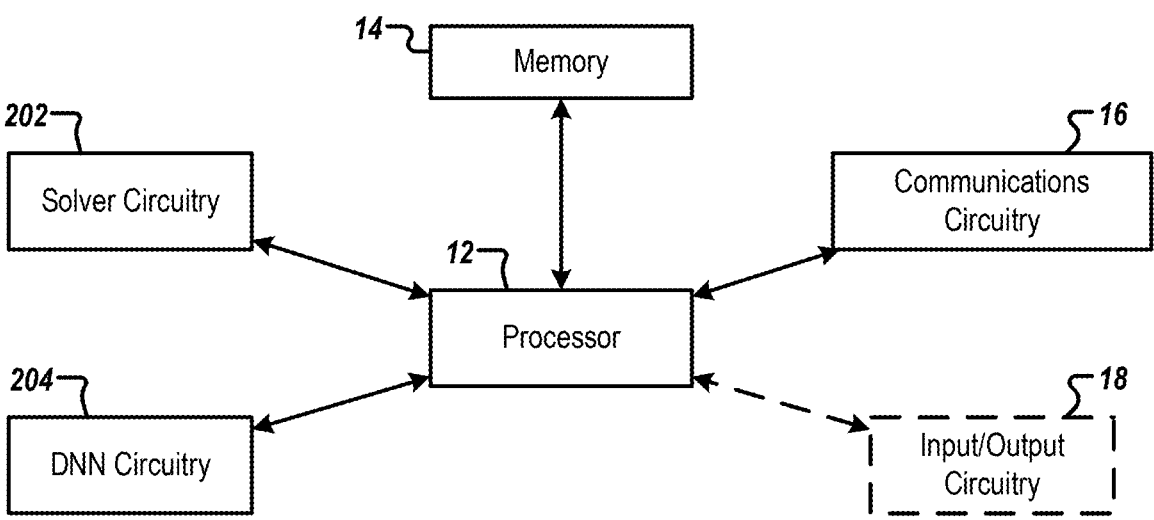
FIG. 2 is a block diagram of a system computing entity that may be specifically configured in accordance with an example embodiment described herein.
Figure 5:
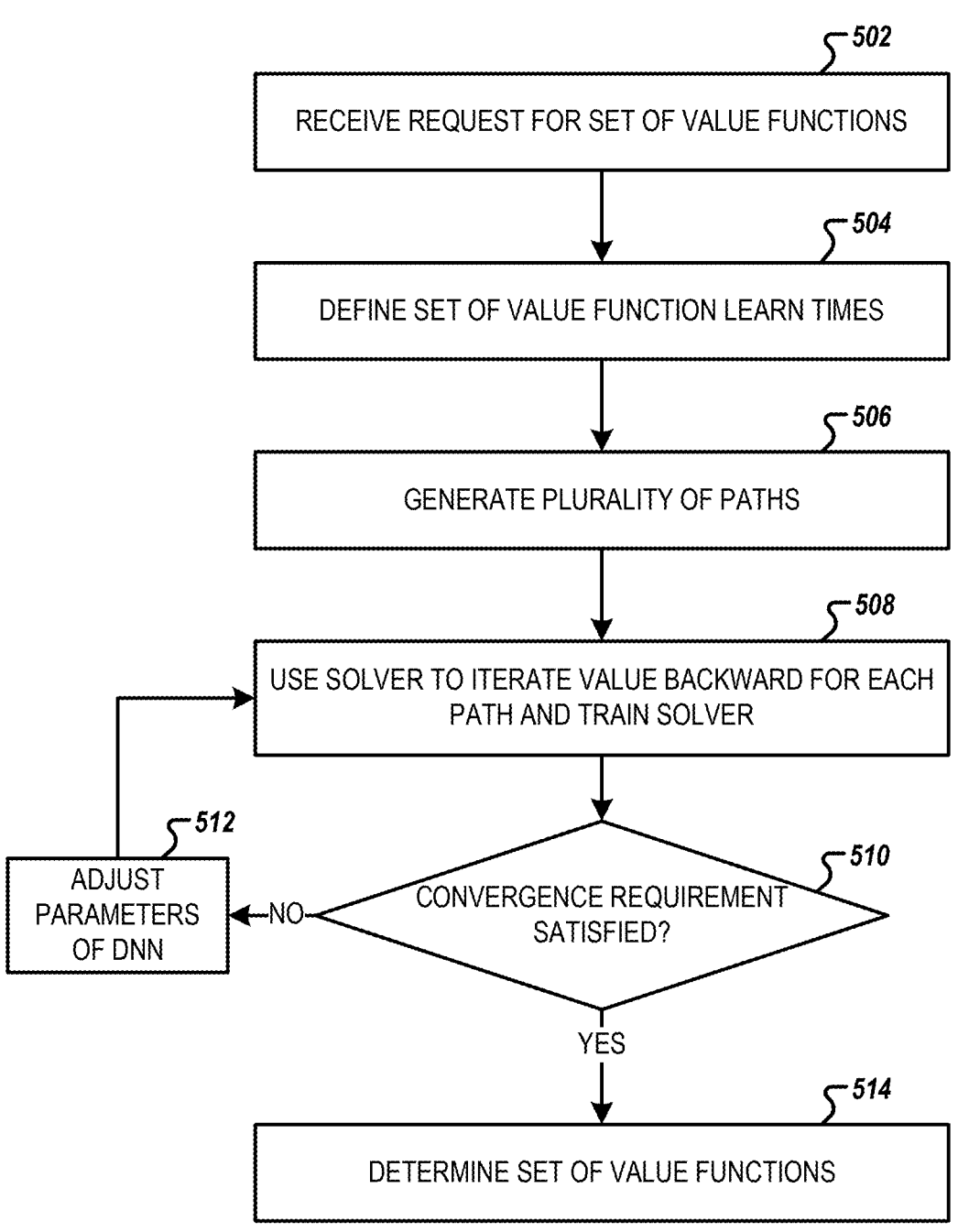
FIG. 5 is a flowchart illustrating operations performed, such as by the system computing entity of FIG. 2 to provide value functions and/or values, in accordance with an example embodiment described herein.

FIG. 5 provides flowchart illustrating operations performed, such as by the model computing entity of FIG. 2 to provide the path wise values/portfolio values and/or functions describing such as a function of a set of underlying objects or items (e.g., assets) at one or more points in time, in accordance with an example embodiment described herein. Starting at block 502, a request for a set of value functions is received. For example, the system computing device 10 may receive a request for a set of value functions. For example, the system computing device 10 may comprise means, such as processor 12, memory 14, communications interface 16, user interface 18, and/or the like, for receiving a request for a set of value functions. In various embodiments, the request for the set of value functions comprises and/or indicates one or more terms and/or features of the portfolio and/or set of underlying objects or items for which the functions are to be provided. For example, the request for the set of value functions may include a description of the portfolio and/or one or more underlying assets, one or more dates of interest (e.g., exercise dates and/or the like for one or more of the underlying objects or items), a valuation date or initial time (e.g., $t_0$), a maturity date or final time (e.g., T), and/or various other terms of the portfolio or one or more underlying assets.

In an example embodiment, the request is automatically generated by the system computing device 10 (e.g., in response to a set and/or programmed trigger). In various embodiments, the request is generated and provided by a user computing device 20 in response to user interaction with an interactive user interface (IUI) provided via the input-output circuitry 28 of the user computing device 20. For example, the user computing device 20 may provide a value functions request IUI similar to the example non-linear portfolio pricing request form 600 shown in FIG. 6. For example, the user computing device 20 may execute application program code to provide the non-linear portfolio pricing request form 600. In various embodiments, the application program code corresponds to a dedicated application; a browser used to access a portal, website, dashboard and/or the like (e.g., provided and/or hosted by the system computing device 10 and/or the like); or other application. In various embodiments, the non-linear portfolio pricing request form 600 comprises one or more fillable and/or selectable instrument information/data fields 602. For example, the user may provide input (e.g., via input-output circuitry 28) to cause one or more fillable and/or selectable instrument information/data fields 602 to be populated by the user computing device 20. The user may then select (e.g., via input-output circuitry 28) a selectable submit feature 604 (e.g., a submit button, icon, and/or the like) to cause the user computing device 20 to generate the request for the set of value functions and provide (e.g., transmit) the request for the set of value functions such that the system computing device 10 receives the request for the set of value functions. For example, the user computing device 20 may comprise means, such as processor 22, memory 24, communications interface 26, input-output circuitry 28, and/or the like, for receiving user input (e.g., via a non-linear portfolio pricing request form 600), generate a request for a set of value functions, and provide the request for the set of value functions.

At block 504, a set of value function learn times is determined. For example, the time between the initial time $t_0$ and the maturity date T may be discretized to define a set of times/dates $\{t_i\}_{0 \leq i \leq N-1}$. The set of dates may include exercise dates for one or more of the underlying objects or items (e.g., based on information/data contained in the request for instrument pricing). One or more of times/dates from the set of times/dates $\{t_i\}_{0 \leq i \leq N-1}$ may be selected as value function learn times $\{t^*_i\}$. For example, the system computing device 10 may define the set of dates and select a set of value function learn times. In various embodiments, the set of dates are a time-ordered set (e.g., the earliest date is the first date of the set of dates and the latest date is the final date of the set of dates). For example, $t_0 < t_1 < \ldots < t_{N-2} < t_{N-1}$, for each date in the set of dates. For example, the system computing device 10 may comprise means, such as processor 12, memory 14, solver circuitry 202, and/or the like, for defining the set of dates and selecting the set of value function learn times from the set of dates. In an example embodiment, the set of dates are defined by the backward DNN solver (e.g., a portion of and/or executable computer code exterior to the DNN of the backward DNN solver). In various embodiments, the loss function of the backward DNN solver includes a term corresponding to each time of the set of value function learn times. For example, the loss function of the backward DNN solve may include a term of the form shown in equation (29) corresponding to one or more times of the set of value function learn times.

At block 506, a plurality of paths may be determined. For example, in the above example, underlying assets of the portfolio $\{X_t\}$ are determined for each date/time of the set of times $\{t_i\}$ for a plurality of portfolio management strategies and the Brownian motion path $\{W(t_i)_{0 \leq i \leq m}\}$ for a plurality (e.g., M+1) paths are determined. For example, the inputs to the DNN of the backward DNN solver may be determined (e.g., possibly by a portion of and/or executable computer code the backward DNN solver that is exterior to the DNN itself). For example, the system computing device 10 may determine a set of portfolios, defined by the underlying assets of the portfolio $\{X_t\}$, and/or other inputs of the DNN of the backward DNN solver. In an example embodiment, each of portfolio of the set of portfolios has the same initial values for the assets, $X_0$. In an example embodiment, the portfolios of the set of portfolios may have different and/or random initial values for the assets, $X_0$. For example, the system computing device 10 may comprise means, such as processor 12, memory 14, solver circuitry 202, and/or the like, for determining a plurality of paths (e.g., a set of portfolios) and/or other inputs of the DNN of the backward DNN solver. In various embodiments, the plurality of paths and/or other inputs of the DNN of the backward DNN solver may be determined, at least in part based on information/data provided in the request for a set of value functions. In an example embodiment, each of the plurality of paths (and/or at least some of the plurality of paths) are Monte Carlo paths. In various embodiments, M+1 paths are determined, where M+1 is in the range of 200 to 5,000. In various embodiments, M+1 is larger than 5,000 or smaller than 200, as appropriate for the application. For each path, a final value may be determined based on the underlying objects or items of the portfolio at a final time T and the payoff replication function (e.g., $Y_T = u(T, X_T) = g(X_T)$). In various embodiments, the portfolios may include a variety of instruments and/or combinations of instruments such as stocks or ETFs, a cash position, instruments with differential rates, and/or the like.

At block 508, the DNN of the backward DNN solver is used to iterate the final value, back through the intermediate values, back to the value of the corresponding portfolio, for each of the plurality of paths. In various embodiments, the determination of each value of the portfolio $u(t_i, X_{t_i})$ are determined through a single iteration of the DNN. For example, the system computing device 20 may determine initial value $Y_0 = u(t_0, X_{t_0})$ and the intermediate discounted payoffs $\{u(t_i, X_{t_i})\}_{0 < i < N-1}$ for each path by iterating backwards in time from the corresponding final value for the portfolio $Y_T = u(T, X_T)$. For example, the system computing device 20 may comprise means, such as processor 12, memory 14, solver circuitry 202, DNN circuitry 204, and/or the like, for determining initial value for the portfolio corresponding to the path $Y_0$ and the intermediate path wise portfolio values $\{Y_{t_i}\}_{0 < i < N-1}$ for each path (e.g., portfolio) by iterating backwards in time from the corresponding final value of the portfolio $Y_T$. For example, a set of initial portfolio values $\{Y_{0_\alpha}\}_{0 \leq \alpha \leq M}$ (e.g., including an initial value for each of the plurality (e.g., M+1) of paths) may be generated.

At block 510, it is determined if a convergence requirement is satisfied. For example, the system computing device 10 may determine if the convergence requirement is satisfied. For example, the system computing device 10 may comprise means, such as processor 12, memory 14, solver circuitry 202, DNN circuitry 204, and/or the like, for determining if the convergence requirement is satisfied. In an example embodiment, the convergence requirement is a defined maximum number of iterations. In an example embodiment, the convergence requirement is a spread threshold requirement corresponding to a statistical measure of spread (e.g., variance, standard deviation, and/or the like) of the set of initial values. For example, the spread threshold requirement may be satisfied when the statistical measure of spread of the set of initial values is smaller than a spread threshold. For example, a statistical measure of spread of the initial set of values may be determined and compared to a spread threshold to determine if the spread threshold requirement (and thus the convergence requirement) is satisfied. In various embodiments, the statistical measure of spread may also consider one or more intermediate instances of the values. For example, the convergence requirement may correspond to the value of the loss function for the paths being no more than a threshold value or the value of the loss function for the paths being minimized.

When, at block 510, it is determined that the convergence requirement is not satisfied, the process continues to block 512. At block 512, the weights and/or parameters $\theta_i$ of the backward DNN solver are modified, adjusted, refined, and/or the like. For example, a loss function may be determined (e.g., as described above with respect to equations (27)-(29)) and the loss function may be used to modify, adjust, refine, and/or the like the weights and/or parameters $\theta_i$ of the backward DNN solver. For example, in an example embodiment, a stochastic gradient descent algorithm may be used to modify, adjust, refine, and/or the like the weights and/or parameters $\theta_i$ of the backward DNN solver to minimize the loss function. For example, the weights and/or parameters $\theta_i$ of the backward DNN solver may correspond to the value functions for the one or more times at the value functions are to be learned. For example, the system computing device 10 may modify, adjust, refine, and/or the like the weights and/or parameters $\theta_i$ of the backward DNN solver. For example, the system computing device 10 may comprise means, such as processor 12, memory 14, solver circuitry 202, DNN circuitry 204, and/or the like, for modifying, adjusting, refining, and/or the like the weights and/or parameters $\theta_i$ of the backward DNN solver.

When, at block 510, it is determined that the convergence requirement is satisfied, the process continues to block 514. At block 514, the value functions and/or portfolio values are determined (e.g., based on the output of the DNN of the backward DNN solver) for one or more points in time. For example, the system computing device 10 may determine a value of the portfolio at one or more points in time or functions that describe the value of the portfolio as a function of the underlying objects or items at one or more points in time. For example, the system computing device 10 may comprise means, such as processor 12, memory 14, solver circuitry 202, DNN circuitry 204, and/or the like, for determining a value of the portfolio at one or more points in time or functions that describe the value of the portfolio as a function of the underlying objects or items at one or more points in time. For example, in an embodiment in which all of the paths correspond to the same initial portfolio $X_0$, the initial value of the portfolio is set as $$Y_0 = \overline{u(t_o, X_0)} = \frac{1}{M+1} \sum_{\alpha=0}^{M} u_\alpha(t_0, X_0)$$

or the average initial value for each path. In various embodiments, the value functions and/or portfolio values may include the initial value, the value of the portfolio at one or more dates $\{t^*_i\}$, and/or the like. The value functions and/or portfolio values are then provided such that the user computing entity 20 receives the value functions and/or portfolio values. For example, the system computing device 10 may provide the value functions and/or portfolio values such that the user computing entity 20 receives the value functions and/or portfolio values. For example, the system computing device 10 may comprise means, such as processor 12, memory 14, communications interface 16, and/or the like, for providing the value functions and/or portfolio values such that the user computing entity 20 receives the value functions and/or portfolio values. In some embodiments, for each of the one or more times, an upper bound value and a lower bound value (or value functions) may be determined.

Figure 7:
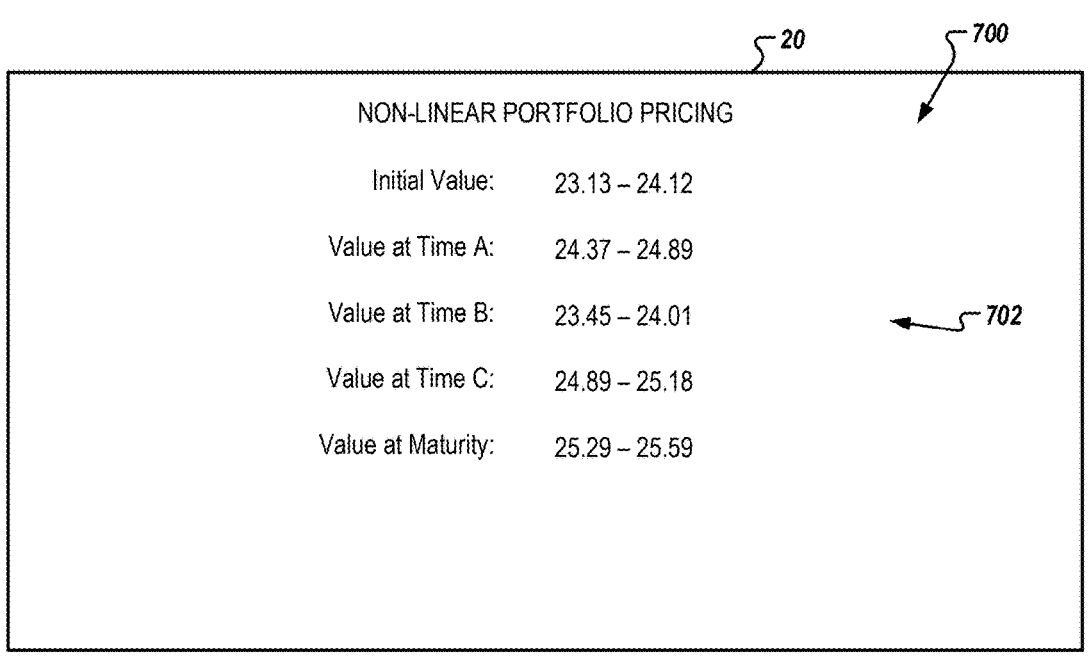
FIG. 7 illustrates an example IUI providing value functions and/or values, according to an example embodiment described herein.

In various embodiments, the user computing device 20 receives the value functions and/or portfolio values. For example, the user computing device 20 may comprise means, such as processor 22, memory 24, communications interface 26, and/or the like for receiving the value functions and/or portfolio values. The user computing device 20 may register and/or process the value functions and/or portfolio values (e.g., via processor 22) and generate and/or render a representation of at least a portion of the value functions and/or portfolio values. For example, a graphical and/or tabular representation of at least a portion of the information/data corresponding to the value functions and/or portfolio values may be generated and/or rendered. For example, the value functions may be used to determine one or more values for a particular portfolio X, and a graphical and/or tabular representation of the one or more values may be generated and/or rendered. The representation of the information/data corresponding to the value functions and/or portfolio values may then be provided (e.g., displayed) via the input-output circuitry 28 of the user computing device 20. For example, the user computing device 20 may execute application program code to provide a portfolio value IUI 700 via the input-output circuitry 28, an example version of which is shown in FIG. 7. In various embodiments, the application program code corresponds to a dedicated application; a browser used to access a portal, website, dashboard and/or the like (e.g., provided and/or hosted by the system computing device 10 and/or the like); or other application. As shown in FIG. 7, an instrument pricing IUI 700 may comprise a representation 702 of at least a portion of the instrument information/data. For example, the representation 702 provides a table of upper bounds and lower bounds for the value of a particular portfolio at multiple times.

In various embodiments, a human or machine user of a user computing device 20 may use at least a portion of the value functions and/or portfolio values to make one or more decisions. For example, the human or machine user may choose to a price for a portfolio, whether or not to purchase a portfolio (e.g., to initiate a computer-implemented process to cause the portfolio to be purchased), and/or the based on the at least a portion of the information/data corresponding to the value functions and/or portfolio values and/or a displayed representation thereof. In an example embodiment, the decisions may need to be made on a relatively short time frame (e.g., less than five minutes, less than fifteen minutes, less than half an hour, and/or the like). In various embodiments, the information/data corresponding to the value functions and/or portfolio values are generated and provided in real time or near real time, by the system computing device 10, with respect to the receiving of the request for the value functions, by the system computing device 10.

In an example embodiment, the user is a model validation machine user that is a model validation module, application, program, and/or the like configured to compare at least a portion of the information/data corresponding to the value functions and/or portfolio values to model determined portfolio value information/data to validate the model and/or the model determined portfolio value information/data. For example, a model that is external to the backward DNN solver may generate model determined portfolio value information/data that corresponds to the value functions and/or portfolio values. For example, the model determined portfolio value information/data may include the initial value, the portfolio value at one or more times, and/or the like for a portfolio that is the same as and/or similar to the portfolio(s) of the paths used to train the backward DNN solver. The model may be part of a line-of-business (LOB) program package or may be another model that is otherwise separate from the backward DNN solver. In an example embodiment, the model validation machine user may comprise computer executable program code operating on the system computing device 10, a user computing device 20, and/or the like.

The model validation machine user compares one or more elements of the model determined portfolio value information/data and the information/data corresponding to the value functions and/or portfolio values to determine if the model determined portfolio value information/data and the information/data corresponding to the value functions and/or portfolio values satisfy a similarity requirement. In an example embodiment, if the ratio of initial value, for example, of the model determined portfolio value information/data to the initial value determined based on the value functions and/or portfolio initial value determined by the backward DNN solver is within a defined range (e.g., 0.8 to 1.25, 0.85 to 1.17, 0.9 to 1.11, 0.95 to 1.05, 0.98 to 1.02, 0.99 to 1.01, and/or the like), it may be determined that the model determined portfolio value information/data and the information/data corresponding to the value functions and/or portfolio values satisfy the similarity requirement. Similarly, if the ratio of the initial value of the model determined portfolio value information/data to the initial value determined based on the backward DNN solver is not within the defined range, the model validation machine user may determine that the similarity requirement is not satisfied. In an example embodiment, if the absolute value of the difference between the initial value of the model determined portfolio value information/data to the initial value determined based on the backward DNN solver or at one or more other times divided by some value (e.g., the initial value of the model determined portfolio value information/data or determined based on the backward DNN solver) is less than a threshold value, it may be determined that the similarity requirement is satisfied. Similarly, if the absolute value of the difference between the initial value of the model determined portfolio value information/data to the initial value determined based on the backward DNN solver or at one or more other times divided by some value (e.g., the initial value of the model determined portfolio value information/data or determined based on the backward DNN solver) is not less than the threshold value, the model validation machine user may determine that the similarity requirement is not satisfied. In another example, if a value for the portfolio as indicated by the model determined portfolio value information/data is within the upper and lower bounds for the portfolio value at the corresponding time, it may be determined that the similarity requirement is satisfied and otherwise not.

When the similarity requirement is satisfied, the model validation machine user may cause the portfolio value information/data to be stored, a log to be updated indicating that the similarity requirement was satisfied, and/or the like. When the similarity requirement is not satisfied, the model validation machine user may cause the portfolio value information/data to be stored, a log to be updated indicating that the similarity requirement was not satisfied, generate and cause an alert to be provided (e.g., via the IUI of the user computing device 20, via an email, instant message, and/or the like), and/or otherwise provide feedback to one or more human users or other machine users that the similarity requirement was not satisfied. In an example embodiment, providing the alert includes causes a representation of the at least a portion of the portfolio value information/data to be provided (e.g., displayed) via the input-output circuitry 28 of the user computing device 20, a representation of at least a portion of the model determined portfolio value information/data to be provided (e.g., displayed) via the input-output circuitry 28 of the user computing device 20, an identification of the model that did not satisfy the similarity requirement, information/data identifying the portfolio for which the model results that did not satisfy the similarity requirement, an indication that the similarity requirement was not satisfied, and/or the like, and/or various combinations thereof.

FIG. 5 illustrates a flowchart describing sets of operations performed by apparatuses, methods, and computer program products according to various example embodiments. It will be understood that each block of the flowcharts, and combinations of blocks in the flowcharts, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computer or other programmable apparatus (e.g., hardware) to produce a machine, such that the resulting computer or other programmable apparatus implements the functions specified in the flowchart blocks. These software instructions may also be stored in a computer-readable memory that may direct a computer or other programmable apparatus to function in a particular manner, such that the software instructions stored in the computer-readable memory produce an article of manufacture, the execution of which implements the functions specified in the flowchart blocks. The software instructions may also be loaded onto a computer or other programmable apparatus to cause a series of operations to be performed on the computer or other programmable apparatus to produce a computer-implemented process such that the software instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Technical Advantages

Figure 8:
FIG. 8 provides a table that demonstrates the effectiveness of two example embodiments of the backward DNN solver compared to results available in the literature for a single instrument.

FIG. 8 provides a table 800 showing a comparison of results for a single instrument provided by the literature (termed the control in FIG. 8) and results determined using a backward DNN solver of two different embodiments (e.g., an embodiment that uses the analytical solution for the non-linear generator function and an embodiment that uses the Taylor expansion approximation for the non-linear generator function). As can be seen from the table 800, the upper and lower bound for the instrument value determined by the backward DNN solver using the analytical solution for the non-linear generator function was in agreement with the upper and lower bound provided by the literature to within 0.03%. The upper and lower bound for the instrument value determined by the backward DNN solver using the Taylor expansion approximation for the non-linear generator function was in agreement with the upper and lower bound provided by the literature to within 0.3%. Thus, in the one dimensional case, the backward DNN solver provides results that are comparable to single instrument value determining tools.

However, various embodiments provide the improvement that multiple instruments and/or a whole portfolio may be considered through one training instance of the backward DNN solver. Indeed, the use of the non-linear function generator as described herein enables the consideration of instruments and/or portfolio elements that have different rates. For example, embodiments of the present disclosure enable the consideration of composite objects comprising a plurality of underlying items that have differential rates. Moreover, due to the computational efficiency of the described backward DNN solver, a significant number of instruments may be considered simultaneously without requiring overwhelming computation resources. Traditional methods for computations for similar linear problems include partial differential equation (PDE) methods, which are only capable of handling low dimensional problems, and standard Monte Carlo methods, which are computationally expensive and cannot effectively solve problems with a large number of dimensions. Moreover, PDE methods become even more computationally demanding for nonlinear problems while standard Monte-Carlo methods cannot handle non-linear problems. Thus, various embodiments described herein enable modelling of values corresponding to composite objects (e.g., portfolios, animal populations) comprising underlying items (e.g., assets, animal sub-populations) that have differential rates in a manner that was previously computationally untenable. Various embodiments of the backward DNN solver therefore provide an improvement in the art and a technical improvement of increased computational efficiency compared to techniques known in the art for determining a value corresponding to a composite object.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

What is claimed is:

1. A method for determining a value corresponding to a strategy on a composite object comprising a set of items, the method comprising:

determining, by one or more processors, a plurality of paths for the composite object based on an initial set of items and Brownian motion paths, each path corresponding to a set of times comprising an initial time, a final time, and one or more intermediate times between the initial time and the final time, wherein the initial set of items corresponds to the set of items at the initial time;

causing, by the one or more processors, a deep neural network (DNN) of a backward DNN solver to be trained, wherein the DNN comprises a set of parameters, wherein the DNN corresponds to a strategy process for a particular time, wherein a set of inputs to the DNN corresponds to the initial set of items of the composite object at the particular time, wherein the composite object at a time immediately before the particular time is evaluated based on an output of the DNN for the particular time, until a convergence requirement is satisfied by:

for each path, determining a final value for the path based on a final set of items of the composite object corresponding to the path at the final time, using a Taylor expansion approximation for a non-linear generator function, iterating backward in time from the final value corresponding to the final time to determine intermediate values each corresponding to one of the one or more intermediate times and to determine an initial value corresponding to the composite object at the initial time, defining a set of initial values comprising the initial value determined for each path and determining one or more statistical measures of spread based on the set of initial values, and modifying the set of parameters of the DNN based on the one or more statistical measures of spread;

after the convergence requirement is satisfied, determining, by the one or more processors, information corresponding to the composite object at one or more times of the set of times based on an output of the DNN, wherein the information comprises indication of a value corresponding to the composite object, wherein the information corresponding to the composite object is based on a single instance of the DNN; and causing, by the one or more processors, at least a portion of the information to be provided such that a user computing device receives the at least a portion of the information and provides a representation of the at least a portion of the information via an interactive user interface provided via a display of the user computing device.

2. The method of claim 1, wherein the one or more statistical measures of spread comprises a loss function that considers a learned function for the value corresponding to the composite object corresponding to a time of the one or more times.

3. The method of claim 2, wherein the loss functions consider a learned function for the value corresponding to the composite object at least one intermediate time of the one or more intermediate times.

4. The method of claim 1, wherein the final value is iterated backward in time to determine the intermediate values and the initial value using an analytical solution for the non-linear generator function.

5. The method of claim 1, wherein a set of items corresponding to the composite object are associated with at least two different rates.

6. The method of claim 1, wherein the set of parameters of the DNN are modified using a stochastic gradient descent training model.

7. The method of claim 1, wherein the DNN comprises a plurality of sub-networks, each sub-network corresponding to a date.

8. The method of claim 1, wherein the DNN is a feed-forward DNN.

9. The method of claim 1, wherein the output of the DNN comprises a function for the value at a time of the one or more times as a function of a set of items corresponding to the composite object.

10. The method of claim 1, wherein the DNN of the backward DNN solver is a sub-network of the backward DNN solver, wherein the backward DNN solver comprises a plurality of sub-networks, wherein each sub-network of the plurality of sub-networks corresponds to a respective time from the set of times.

11. An apparatus for determining a value corresponding to a composite object, the apparatus comprising:

processor circuitry configured to:

determine a plurality of paths based on an initial set of items of the composite object and Brownian motion paths, each path corresponding to a set of times comprising an initial time, a final time, and one or more intermediate times between the initial time and the final time;

cause a deep neural network (DNN) of a backward DNN solver to be trained, wherein the DNN comprises a set of parameters, wherein the DNN corresponds to a strategy process for a particular time, wherein a set of inputs to the DNN corresponds to the initial set of items of the composite object at the particular time, wherein the composite object at a time immediately before the particular time is evaluated based on an output of the DNN, until a convergence requirement is satisfied by:

for each path, determining a final value for the path based on a final set of items corresponding to the path at the final time, using a Taylor expansion approximation for a non-linear generator function, iterating backward in time from the final value corresponding to the final time to determine intermediate values each corresponding to one of the one or more intermediate times and to determine an initial value corresponding to the composite object at the initial time, defining a set of initial values comprising the initial value determined for each path and determining one or more statistical measures of spread based on the set of initial values, and modifying the set of parameters of the DNN based on the one or more statistical measures of spread;

after the convergence requirement is satisfied, determine information corresponding to the composite object at one or more times of the set of times based on an output of the DNN, wherein the information comprises indication of a value corresponding to the composite object; and cause at least a portion of the value information to be provided such that a user computing device receives the at least a portion of the value information and provides a representation of the at least a portion of the value information via an interactive user interface provided via a display of the user computing device.

12. The apparatus of claim 11, wherein the one or more statistical measures of spread comprises a loss function that considers a learned function for the value corresponding to the composite object corresponding to a time of the one or more times.

13. The apparatus of claim 12, wherein the loss functions consider a learned function for the value for the composite object at least one intermediate time of the one or more intermediate times.

14. The apparatus of claim 11, wherein the final value is iterated backward in time to determine the intermediate values and the initial value using an analytical solution for the non-linear generator function.

15. The apparatus of claim 11, wherein a set of items corresponding to the composite object are associated with at least two different rates.

16. The apparatus of claim 11, wherein the set of parameters of the DNN are modified using a stochastic gradient descent training model.

17. The apparatus of claim 11, wherein the DNN comprises a plurality of sub-networks, each sub-network corresponding to a date.

18. The apparatus of claim 11, wherein the DNN is a feedforward DNN.

* * * * *